United States Patent
Tylik et al.

(10) Patent No.: US 12,282,493 B2
(45) Date of Patent: Apr. 22, 2025

(54) DATA STORAGE OBJECT CLONING IN A MULTI-APPLIANCE FEDERATION

(71) Applicant: Dell Products L.P., Round Rock, TX (US)

(72) Inventors: Dmitry Nikolayevich Tylik, Westborough, MA (US); Nagasimha Haravu, Chapel Hill, NC (US)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 17/965,991

(22) Filed: Oct. 14, 2022

(65) Prior Publication Data

US 2024/0126777 A1    Apr. 18, 2024

(51) Int. Cl.
*G06F 16/00*  (2019.01)
*G06F 16/21*  (2019.01)
*G06F 16/27*  (2019.01)

(52) U.S. Cl.
CPC ............ *G06F 16/27* (2019.01); *G06F 16/214* (2019.01)

(58) Field of Classification Search
CPC ................................ G06F 16/27; G06F 16/214
See application file for complete search history.

(56) References Cited

U.S. PATENT DOCUMENTS

| 8,612,682 | B2 | 12/2013 | Jaquette |
| 8,935,206 | B2 * | 1/2015 | Aguilera ............ G06F 11/1464 709/224 |
| 10,311,151 | B2 | 6/2019 | Tabaaloute et al. |
| 11,099,777 | B2 | 8/2021 | Haravu et al. |
| 2020/0034077 | A1 * | 1/2020 | Haravu .................. G06F 3/067 |

* cited by examiner

*Primary Examiner* — Tyler J Torgrimson
(74) *Attorney, Agent, or Firm* — BainwoodHuang

(57) ABSTRACT

A method of creating a clone, on a second data storage appliance of a federation, of a source storage object stored on a first data storage appliance of the federation, includes creating a snapshot (point-in-time copy) of the source storage object at the first appliance, and then performing a full copy of the snapshot from the first appliance to the second appliance to produce a copy snapshot on the second appliance. At the second appliance, the clone is created from the copy snapshot and incorporated into a federation-wide family association of the source storage object. Specific use cases include (1) creating a clone on a different appliance from a base volume, (2) migrating a clone to a different appliance from a base volume, (3) refreshing a clone from a base volume, and a base volume from a clone, across appliances.

16 Claims, 6 Drawing Sheets

DATA STORAGE OBJECT CLONING IN A MULTI-APPLIANCE FEDERATION

BACKGROUND

The invention relates to the field of data storage, and in particular to techniques for creating clone volumes in multi-appliance clusters or federations of data storage systems.

SUMMARY

A method is disclosed of creating a clone, on a second data storage appliance of a federation, of a source storage object stored on a first data storage appliance of the federation. The method includes, at the first data storage appliance, creating a snapshot (point-in-time copy) of the source storage object, and then performing a full copy of the snapshot from the first data storage appliance to the second data storage appliance to produce a copy snapshot on the second data storage appliance. At the second data storage appliance, the clone is created from the copy snapshot and incorporated into a federation-wide family association of the source storage object.

Several use cases are described, including (1) a clone on a different appliance from a base volume, (2) migrating a clone to a different appliance from a base volume, (3) refreshing a clone from a base volume, and a base volume from a clone, across appliances.

The technique can provide for flexibility and performance improvements based on applications separately using a primary volume on one appliance and a clone on another appliance.

BRIEF DESCRIPTION OF THE DRAWINGS

The foregoing and other objects, features and advantages will be apparent from the following description of embodiments of the invention, as illustrated in the accompanying drawings in which like reference characters refer to the same parts throughout the different views.

DETAILED DESCRIPTION

Overview

A data storage system is disclosed as a scale out federation of highly available two node storage appliances that supports storage-oriented host attachment interfaces such as iSCSI, Fibre Channel and NVMe over Fabrics. The system supports block storage features, such as space-efficient volume clones and volume migration across appliances in a federation. In one embodiment, the data storage system may be incorporated into PowerStore™ data storage systems sold by Dell Technologies.

One limitation of existing data storage federations is an inability to create or migrate clones on a different appliance in a federation from the base volume. This limitation arises in part due to the way clones are realized, i.e., as derivative objects that share blocks with the primary object according to a block map. Multi-appliance federations generally do not support block sharing across appliances.

However, there are several potential use cases for the ability to locate clones on different appliances than their respective primary volumes. For example, such placement can be beneficial to run separate I/O intensive workloads on the base volume (e.g., a database application) and the clone (e.g., analytics application), such that I/O to the base volume runs through front-end ports on one appliance and I/O to the clone runs through front-end ports on a different appliance. Such a technique essentially provides a front-end I/O capacity scale out, enhancing system flexibility and performance.

Thus, disclosed herein is a technique for creating a clone on one appliance of a multi-appliance federation from a primary storage object located on another appliance of the federation. The technique can support various use cases including the following:
1. Create a clone on a different appliance from a base volume.
2. Migrate a clone to a different appliance from the base volume.
3. Refresh clone from the base volume, and base volume from the clone, across appliances.

DESCRIPTION OF EMBODIMENTS

Figure 1:
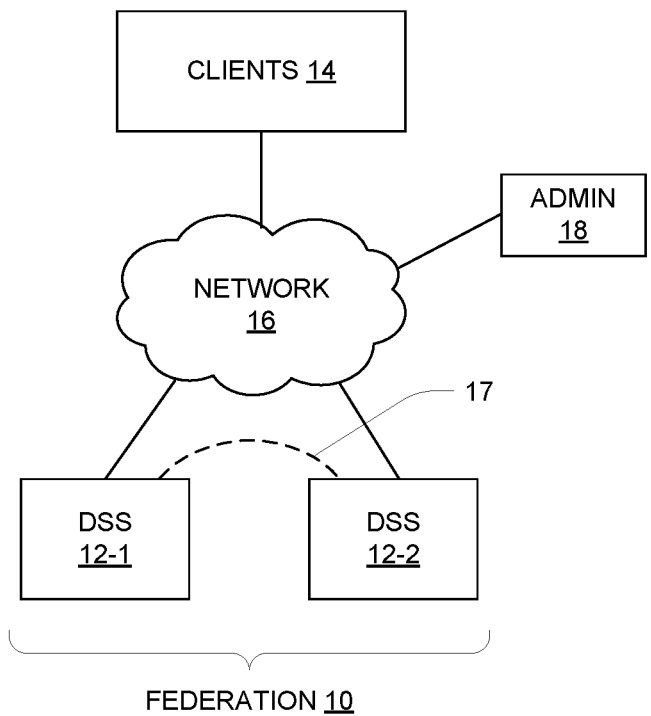
FIG. 1 is a block diagram of a computer system including a federation of data storage systems ("appliances")

FIG. 1 shows a computer system that includes a federation 10 of data storage systems 12 (DSSs 12-1 and 12-2 as shown), also referred to as "appliances" herein. The DSSs 12 are coupled to data storage clients 14 (e.g., host computers) by a network 16, and a connection 17 provides for certain inter-DSS communications as described more below. The system may also have a separate storage administrator system (ADMIN) 18 as shown.

In operation, each DSS provides physical storage as well as various logical operations to provide data storage services to the clients 14, as generally known in the art. In particular, the DSSs 12 may provide storage structured as "volumes" having visibility to the clients 14. A volume may be viewed as a logical or virtual representation of a large unit of data storage, analogous to a physical "disk" or "device." Modern data storage systems may host thousands of volumes using extensive underlying physical storage resources such as Flash memory arrays, magnetic media, etc. The clients 14 direct I/O requests to the volumes, and the DSSs 12 are responsible for translating the volume representation to a representation at the physical storage layer of operation, where volume data is physically stored.

Figure 2:
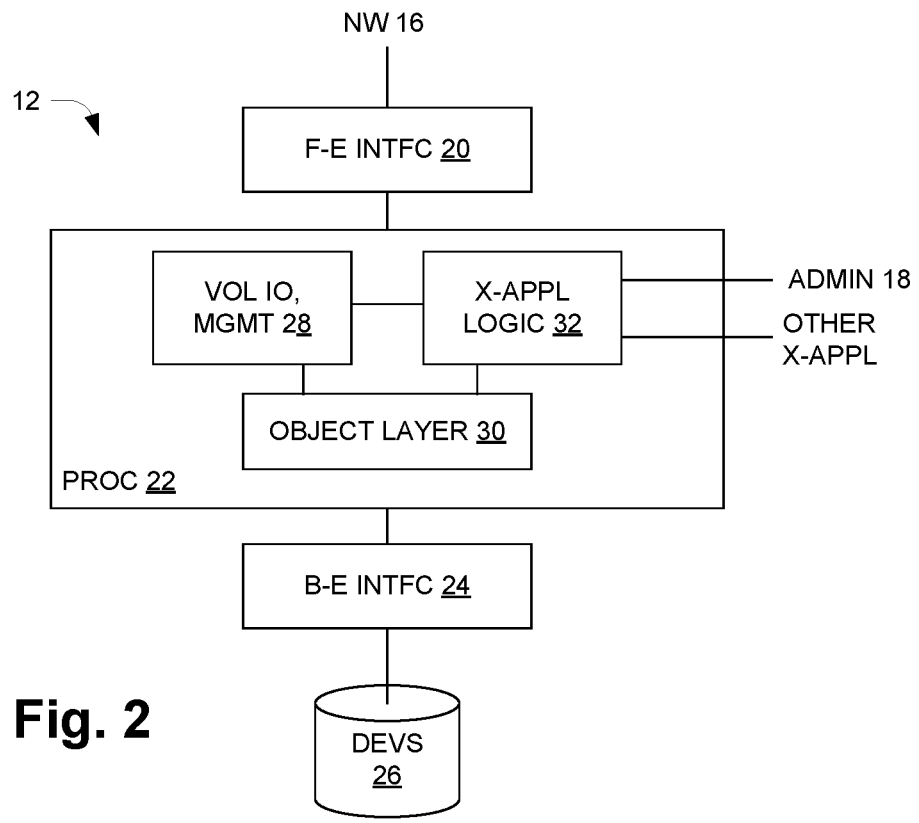
FIG. 2 is a block diagram of a data storage system.

FIG. 2 shows relevant structure and organization of a DSS 12. In includes front-end interface circuitry (F-E INTFC) 20, processing circuitry (PROC) 22, back-end interface circuitry (B-E INTFC) 24, and physical storage devices (DEVS) 26. From a hardware perspective, the processing circuitry 22 includes multi-core processors, memory, and I/O interface circuitry and executes specialized data storage software to provide data storage functionality. In the present context, the functional processing is divided into three components as shown: volume I/O and management (VOL IO, MGMT) 28, object layer 30, and cross-appliance logic (X-APPL LOGIC)

32. The main I/O processing component 28 is responsible for all the client-visible storage functionality such as processing read and write I/O requests. The cross-appliance logic 32 is responsible for certain operations that occur between appliances 12 of the federation, as described more below. It has communications connections to the storage administrator 18 (via network 16, see FIG. 1) as well as to the cross-appliance logic 30 of other DSSs 12 of the federation 10 (via connections 17, see FIG. 1).

The object layer 30 is responsible for maintaining the representations of volumes and other logical storage objects based on physical storage resources provided by the physical storage devices 26, as generally known in the art. This processing includes mapping logic that maps blocks of a logical representation to physical block addresses. It also includes maintaining representations and mappings for derivative storage objects such as clones and snapshots. As used herein, "clone" refers to a derivative object that can be the target of user I/O, for example in testing or other use separate from the use of a primary volume by an application. A snapshot is a point-in-time copy and is typically used in a read-only manner, e.g., for backup and recovery, or as here, as a mechanism for creating other derivative objects such as clones.

Derivative-storage functionality employs physical block sharing for efficient use of physical storage and other system resources. For example, a clone can be represented as a set of pointers to the same single set of physical storage blocks of a primary storage object. Similarly, a snapshot can be created as a set of pointers to a set of physical storage blocks that constitute a primary storage object at a given point in time. As the primary object later evolves, its block mappings and underlying physical storage generally diverges from those of the snapshot, and specialized functionality of the object layer 30 manages the block sharing to correctly represent both objects as operation proceeds.

Figure 3:
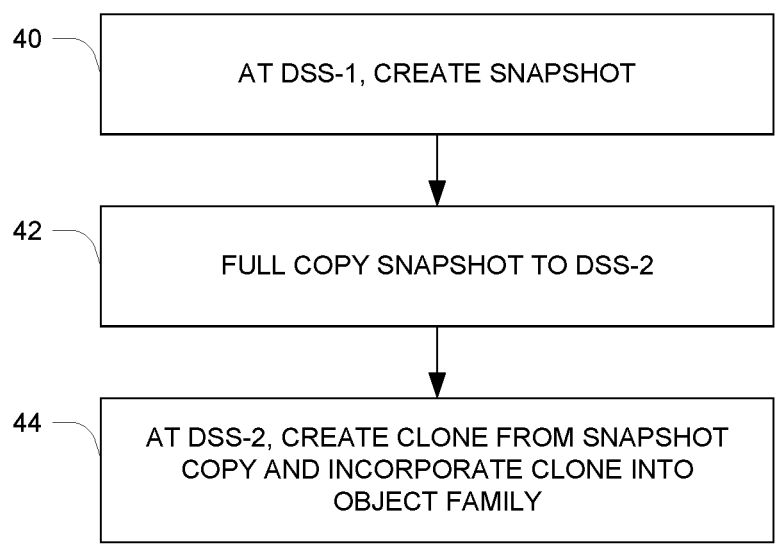
FIG. 3 is a flow diagram of a process of creating a clone from a data storage object located on a separate appliance of a federation.

FIG. 3 shows certain operation, which is performed in large part by the components 28-32 of the processing circuitry 22. Overall, the operation creates a clone, on one data storage appliance of a federation (e.g., DSS 12-2 of federation 10), of a source storage object stored on another data storage appliance (e.g., 12-1) of the federation. It will be appreciated that the source storage object may be one of several types, including for example a primary volume or a clone, which are described below in more specific schemes.

Referring to FIG. 3, at 40 the first data storage appliance (e.g., 12-1) creates a local snapshot of the source storage object. As generally known, a snapshot (or "snap") is a point-in-time copy.

At 42, a full copy is performed of the snapshot from the first data storage appliance to a second data storage appliance (e.g., 12-2) to produce a copy snapshot on the second data storage appliance. "Full copy" refers to the need to copy all the data of the object, which is needed in part because of the inability to share blocks between appliances.

At 44, at the second data storage appliance, a clone is created from the copy snapshot and incorporated into a federation-wide family association of the source storage object. This on-appliance operation can employ block sharing for efficiency. As described more below, the clone can be maintained in synchronism with the storage object on the first appliance by subsequent update (refresh) operations. Going forward, the new clone can be the subject of user I/O to satisfy system operational needs, e.g., the above-mentioned scenario of having separate applications access the clone and the storage object from which it was created. The family representation is something visible to and maintained by the storage administrator 18, for purposes of managing the storage system and its constituent object as part of a larger data processing system.

Figure 4:
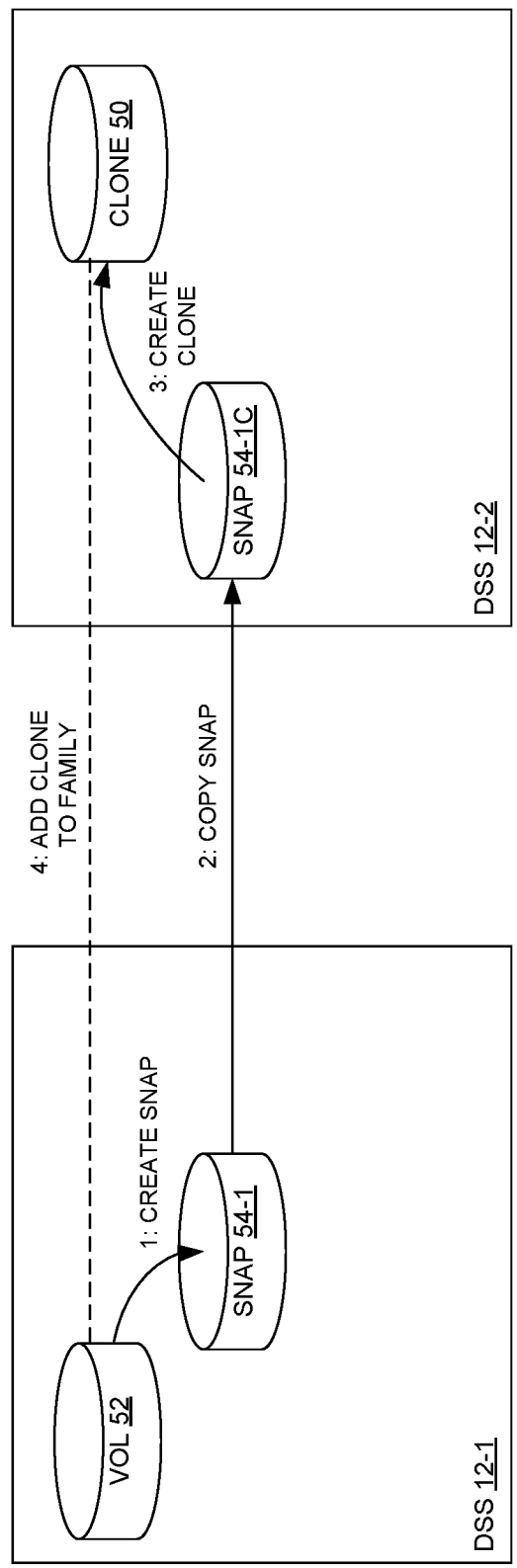
FIG. 4 is a schematic depiction of a scheme for creating a clone of a base volume located on a separate appliance of a federation.

FIG. 4 shows a first use case in which a clone 50 is created on a different appliance (12-2) than a base primary volume 52 (stored on appliance 12-1). Operation is as follows:

1. Create a snapshot of the base volume 52 hosted on appliance 12-1. The snapshot is shown as Snapshot 54-1.
2. Full copy Snapshot 54-1 to Appliance 12-2 using a facility of the cross-appliance logic 32, e.g., a replication engine. The new snapshot is shown as Snapshot 54-1C.
3. Create the volume clone 50 from Snapshot 54-1C on Appliance 12-2.
4. Add the newly created clone 50 into the base volume family.

As generally known, a volume family may have a tree-oriented structure, with higher nodes representing more foundational or primary objects and lower nodes representing successively derived objects. In the simple example of FIG. 4, the primary volume 52 serves as a single top-level node, and the snapshots 54 and clone 50 are represented as lower-level nodes. In this example, the clone 50 assumes a leaf position, i.e., it has no other objects derived from it. As mentioned below, it is possible during subsequent operation that other snapshots and/or clones may be created from clone 50 on DSS 12-2, in which case the clone 50 assumes a more intermediate position in the family tree, with the newer objects attached to it at lower levels. To the extent these additional objects reside on the second DSS 12-2, they can be realized using block sharing with its attendant efficiencies.

Figure 5:
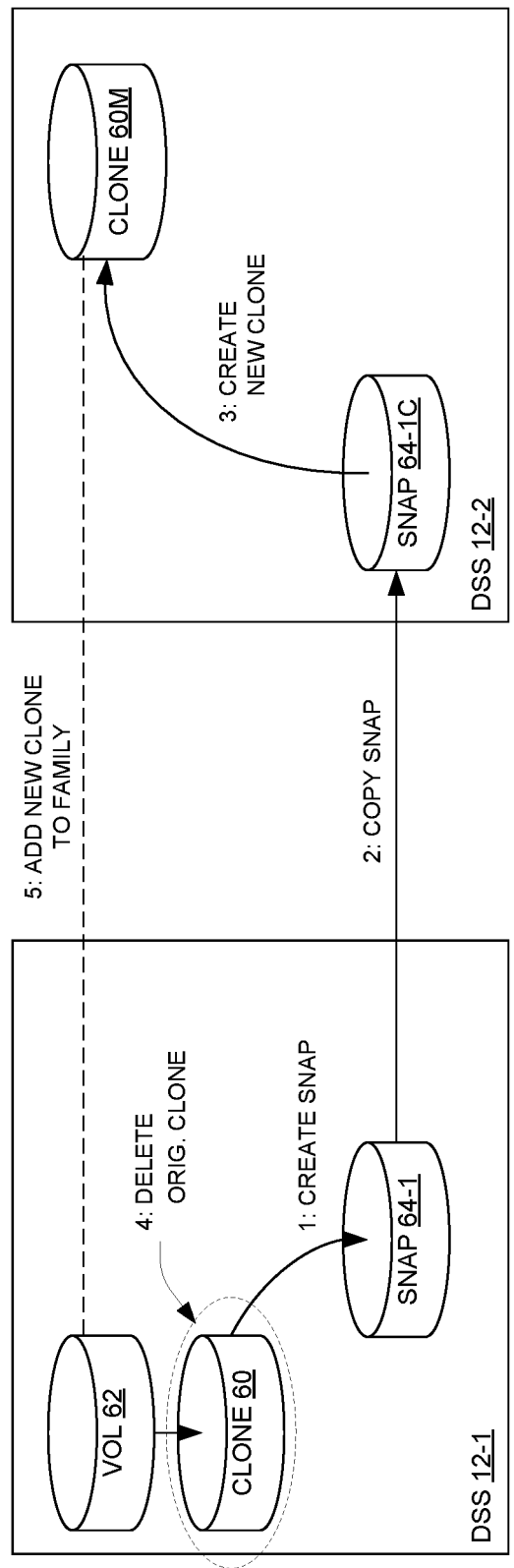
FIG. 5 is a schematic depiction of a scheme for migrating a clone between appliances of a federation.

FIG. 5 illustrates another use case in which an existing clone 60 that is initially co-located with a base volume 62 can be migrated from one appliance 12-1 to another appliance 12-2. This process is as follows:

1. Create a snapshot of the original Clone 60 hosted on Appliance 12-1. The snapshot is shown as Snapshot 64-1.
2. Full copy Snapshot 64-1 to Appliance 12-2 using replication engine, New snapshot is shown as Snapshot 64-1C.
3. Create new volume clone 60M from Snapshot 64-1C on Appliance 12-2.
4. Delete the original clone 60 on Appliance 12-1.
5. Add the newly created clone 60M into base volume family. The migrated clone 60M replaces the original clone 60, except that it is located on another appliance 12 of the federation rather than being co-located with the primary volume 62.

It will typically be preferred that the above operation be performed during ongoing regular operation of the system, in which case it must be done as non-disruptively as possible. Detail on non-disruptive I/O cutover that can be utilized for clone migration is described in U.S. Pat. No. 10,789,018 "Supporting non-disruptive movement of a logical volume of non-volatile data storage between storage appliances" to Tylik, et al.

The above approach can be expanded to migration of a clone that is an intermediate node in a clone tree and not a leaf. For such a clone, after the above steps are performed and the new clone 60-M is added into the base volume family, the next step is to copy the relationships with the original "parent" and "child" clones and snapshots. The process can be applied recursively to effect migration of a clone subtree including both node and leaf clones.

Figure 6:
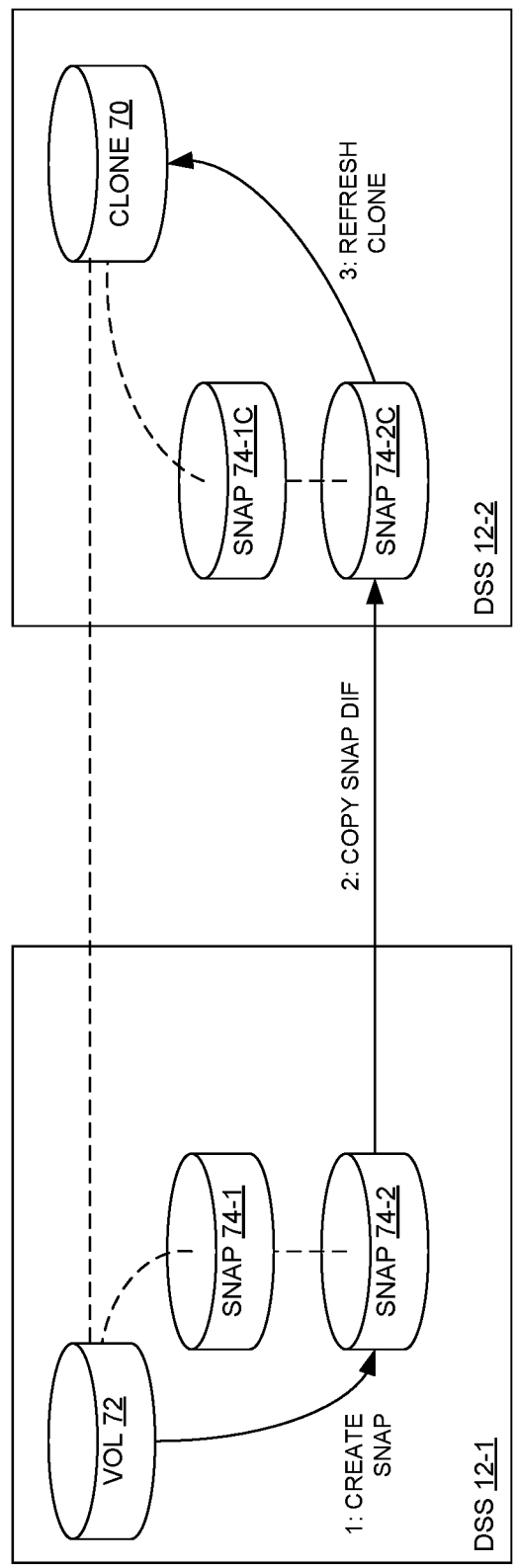
FIG. 6 is a schematic depiction of a scheme for refreshing a clone from a base volume across appliances of a federation.

FIG. 6 illustrates a third use case in which a clone 70 is located on a different appliance (e.g., 12-2) than the base volume 72 and is refreshed from the base volume 72. It is assumed that the clone 70 was created using snapshots 74-1, 74-1C using the technique described above. The process includes:

1. Create a new snapshot 74-2 of the volume 72 on Appliance 12-1.
2. Copy the difference between Snapshot 74-2 and Snapshot 74-1 on Appliance 1 to the other appliance 12-2, where the differences are used to create a new Snapshot 74-2C referenced to the local copy 74-1C of the earlier snapshot 74-1. Once this process is completed, Snapshot 74-2C on Appliance 12-2 contains volume state from which the Clone 70 can be refreshed (e.g., data deletions and additions can be applied).
3. Refresh Clone 70 from Snapshot 74-2C.

Figure 7:
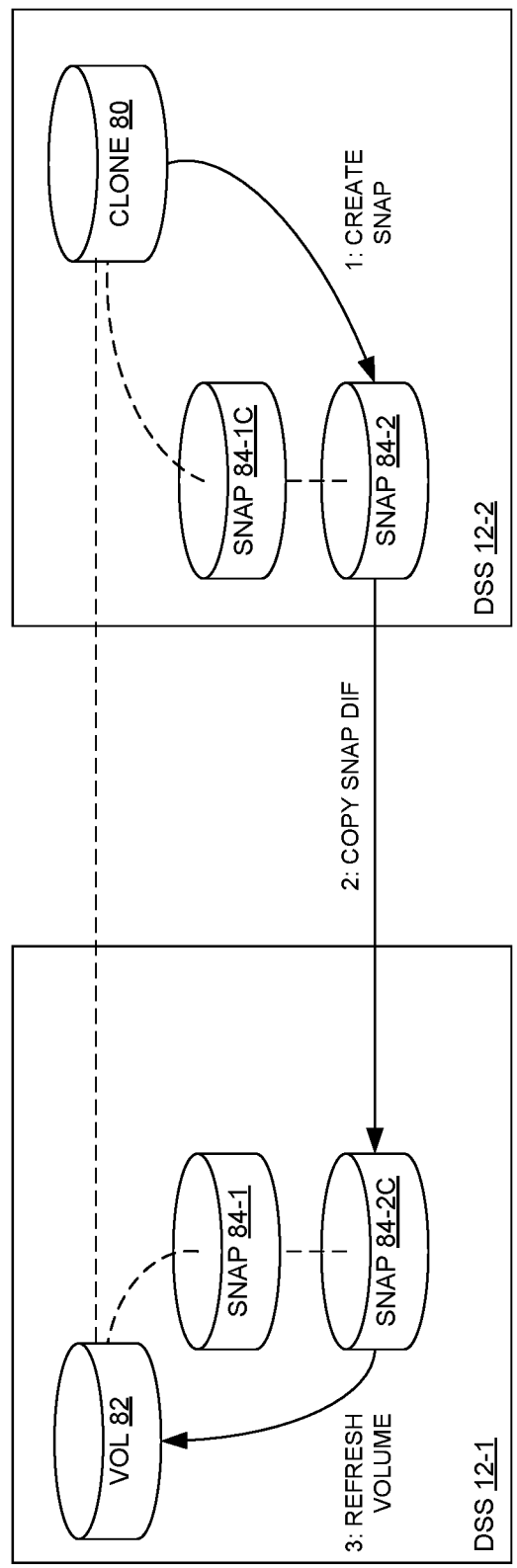
FIG. 7 is a schematic depiction of a scheme for refreshing a base volume from a clone across appliances of a federation.

FIG. 7 illustrates an analogous use case in which a base volume 82 is refreshed from a clone 80 across appliances 12.

1. Create a new snapshot 84-2 of the Clone 80 on Appliance 12-2.
2. Copy the difference between Snapshot 84-2 and Snapshot 84-1C on Appliance 12-2 to the other appliance 12-1 to create a new Snapshot 84-2C on Appliance 12-1. Once this process completes, Snapshot 84-2C on Appliance 12-1 contains Clone state from which the primary Volume 82 can be refreshed.
3. Refresh Volume 82 from Snapshot 84-2C.

While various embodiments of the invention have been particularly shown and described, it will be understood by those skilled in the art that various changes in form and details may be made therein without departing from the scope of the invention as defined by the appended claims.

What is claimed is:

1. A method of creating a clone, on a second data storage appliance of a federation, of a source storage object stored on a first data storage appliance of the federation, comprising:
   at the first data storage appliance, creating a snapshot being a point-in-time copy of the source storage object;
   performing a full copy of the snapshot from the first data storage appliance to the second data storage appliance to produce a copy snapshot on the second data storage appliance;
   at the second data storage appliance, creating the clone from the copy snapshot and incorporating the clone into a federation-wide family association of the source storage object; and
   subsequently:
   1. Having separate applications access the clone and the source storage object at the first and second data storage appliances respectively, and
   2. Maintaining the clone in synchronism with the source storage object by subsequent refresh operations each including (i) creating a new snapshot of the source storage object on the first data storage appliance, (ii) copying a snapshot difference between the new snapshot and the snapshot on the first data storage appliance to the second data storage appliance, the snapshot difference being used to create a new copy snapshot referenced to the copy snapshot on the second data storage appliance, the new copy snapshot containing volume state from which the clone can be refreshed, (iii) and refreshing the clone from the new copy snapshot.

2. The method of claim 1, wherein block sharing is used within the first data storage appliance and the second data storage appliance to realize the snapshot and the clone respectively, and the full copy is necessitated by lack of block sharing between the first and data storage appliances.

3. The method according to claim 1, wherein the source storage object is a primary volume having a highest position in a tree-structured representation of the family association.

4. The method according to claim 1, wherein the clone is a new clone and the source storage object is an existing clone of a primary volume, the existing clone having an intermediate position in a tree-structured representation of the family association.

5. The method according to claim 4, wherein the snapshot is subsequently retained at the first data storage appliance.

6. The method according to claim 4, applied recursively to migrate a clone tree having a plurality of clones in the family association.

7. The method of claim 1, wherein the snapshot is a first snapshot and the copy snapshot is a first copy snapshot, and further including refreshing the source storage object from the clone by steps including:
   creating a second new snapshot of the clone on the second data storage appliance;
   copying a snapshot difference between the second new snapshot and the first copy snapshot on the second data storage appliance to the first data storage appliance, the snapshot difference being used to create a second new copy snapshot referenced to the first snapshot on the first data storage appliance, the second new copy snapshot containing volume state from which the source storage object can be refreshed; and
   refreshing the source storage object from the second new snapshot copy.

8. The method of claim 7, wherein the source storage object is a primary volume.

9. A data storage system including front-end interface circuitry for interfacing to separate client computers, physical storage devices providing physical data storage, processing circuitry, and back-end interface circuitry for interfacing to the physical storage devices, the processing circuitry including one or more processors and memory for storing and executing computer software to cause the data storage system to function as a first data storage appliance of a multi-appliance federation by co-operating with a second data storage appliance of the federation to create a clone on the second data storage appliance of a source storage object stored on the first data storage appliance, by:
   creating a snapshot being a point-in-time copy of the source storage object;
   performing a full copy of the snapshot from the first data storage appliance to the second data storage appliance to produce a copy snapshot on the second data storage appliance;
   upon creation of the clone from the copy snapshot at the second data storage appliance, incorporating the clone into a federation-wide family association of the source storage object; and
   subsequently:
   1. Having separate applications access the clone and the source storage object at the first and second data storage appliances respectively, and
   2. Maintaining the clone in synchronism with the source storage object by subsequent refresh operations each including (i) creating a new snapshot of the source storage object on the first data storage appliance, (ii) copying a snapshot difference between the new snapshot and the snapshot on the first data storage appliance to the second data storage appliance, the snapshot difference being used to create a new copy snapshot referenced to the copy snapshot on the second data storage appliance, the new copy snapshot containing volume state from which the clone can be refreshed, (iii) and refreshing the clone from the new copy snapshot.

10. The data storage system of claim 9, wherein block sharing is used within the first data storage appliance and the second data storage appliance to realize the snapshot and the clone respectively, and the full copy is necessitated by lack of block sharing between the first and data storage appliances.

11. The data storage system of claim 9, wherein the source storage object is a primary volume having a highest position in a tree-structured representation of the family association.

12. The data storage system of claim 9, wherein the clone is a new clone and the source storage object is an existing clone of a primary volume, the existing clone having an intermediate position in a tree-structured representation of the family association.

13. The data storage system of claim 12, wherein the snapshot is subsequently retained at the first data storage appliance.

14. The data storage system of claim 12, wherein recursive operation is used to migrate a clone tree having a plurality of clones in the family association.

15. The data storage system of claim 9, wherein the snapshot is a first snapshot and the copy snapshot is a first copy snapshot, and wherein operation further includes refreshing the source storage object from the clone by steps including:
  creating a second new snapshot of the clone on the second data storage appliance;
  copying a snapshot difference between the second new snapshot and the first copy snapshot on the second data storage appliance to the first data storage appliance, the snapshot difference being used to create a second new copy snapshot referenced to the first snapshot on the first data storage appliance, the second new copy snapshot containing volume state from which the source storage object can be refreshed; and
  refreshing the source storage object from the second new snapshot copy.

16. The data storage system of claim 15, wherein the source storage object is a primary volume.

* * * * *